US006738813B1

(12) United States Patent
Reichman

(10) Patent No.: US 6,738,813 B1
(45) Date of Patent: May 18, 2004

(54) SYSTEM AND METHOD FOR MONITORING PERFORMANCE OF A SERVER SYSTEM USING OTHERWISE UNUSED PROCESSING CAPACITY OF USER COMPUTING DEVICES

(75) Inventor: David Reichman, Sunnyvale, CA (US)

(73) Assignee: Mercury Interactive Corporation, Sunnyvale, CA (US)

( * ) Notice: Subject to any disclaimer, the term of this patent is extended or adjusted under 35 U.S.C. 154(b) by 617 days.

(21) Appl. No.: 09/659,476

(22) Filed: Sep. 11, 2000

(51) Int. Cl.[7] .............................................. G06F 15/173

(52) U.S. Cl. ...................................... 709/224; 709/223

(58) Field of Search ................................. 709/224, 223, 709/225, 238, 241, 105

(56) References Cited

U.S. PATENT DOCUMENTS

| 5,742,754 | A | | 4/1998 | Tse |
| 5,781,703 | A | * | 7/1998 | Desai et al. ................. 709/224 |
| 5,812,780 | A | * | 9/1998 | Chen et al. .................. 709/224 |
| 5,905,868 | A | | 5/1999 | Baghai et al. |
| 6,006,260 | A | | 12/1999 | Barrick, Jr. et al. |
| 6,061,725 | A | * | 5/2000 | Schwaller et al. ........... 709/224 |
| 6,138,157 | A | | 10/2000 | Welter et al. |
| 6,157,618 | A | * | 12/2000 | Boss et al. ................... 709/224 |
| 6,205,413 | B1 | | 3/2001 | Bisdikian et al. |
| 6,466,548 | B1 | * | 10/2002 | Fitzgerald ................... 370/249 |
| 6,591,298 | B1 | * | 7/2003 | Spicer et al. ............... 709/224 |
| 6,606,658 | B1 | * | 8/2003 | Uematsu ..................... 709/224 |

OTHER PUBLICATIONS

Press release dated Feb. 14, 2001 titled: "Porivo Technologies Launches First Web Performance Testing Application Powered by Peer–to–Peer Distributed Computing Technology," printed from porivo.com web site.

Press release dated Oct. 2, 2000 titled: "Porivo Technologies Launches the Porivo Peer: Distributed Computing Technology Harnesses Spare Computing Capacity Across the Internet," printed from porivo.com web site.

Article dated Aug. 12, 2000 by Catherine Linden Traugot, titled "News from the Triangle: Finding use for idle power," printed from Upside Today web site.

(List continued on next page.)

Primary Examiner—Patrice Winder
Assistant Examiner—Philip B. Tran
(74) Attorney, Agent, or Firm—Knobbe, Martens, Olson & Bear LLP

(57) ABSTRACT

A monitoring system provides a service for users to monitor their respective Web sites, or other server systems, as seen from the computing devices of other users. In a preferred embodiment, the system includes an agent component that runs on the computing devices of service users to provide functionality for accessing and monitoring the performance of a server (preferably when such devices are otherwise idle). By running the agent component on a computer, a user effectively makes that computer available to others for use as a monitoring agent. Processing resources for conducting monitoring sessions are thus contributed and shared by members of a community. The agents are remotely configurable over the Internet, and may be configured, for example, to execute a particular Web transaction while monitoring specified performance parameters (server response times, network hop delays, server availability, etc). Using a service provider Web site, a user of the service can set up a monitoring session in which agent devices of other community members are used to monitor the performance of the user's server system. In one embodiment, the system implements a reciprocity policy in which the extent to which a user may use the service for monitoring is dependent upon the quantity of processing resources (e.g., transaction execution events) that user has contributed to the community. Performance data collected by the agents may be used both to generate server-specific reports and general Internet "weather maps."

23 Claims, 5 Drawing Sheets

OTHER PUBLICATIONS

Duchien, L., Gay V. and Horlait E., "X.400–Based Distributed Application Design Methodology" ACM Annual Computer Science Conference, Mar. 3–5, 1992, pp. 517–523.

Randall, N., "Web Site Analysis Tools: The Results Are In," PC Magazine, Mar. 10, 1998, pp. 188–210.

Dalton, G., "Online Measurement—Keynote's service lets companies see what customers see," Information Week Online, May 10, 1999 (2 pages printed from informationWeek.com Web Site).

Mainkar, V., "Availability Analysis of Transaction Processing Systems based on User–Perceived Performance," Proc. Sixteeth Symp. On Reliable Distributed Systems, pp. 10–17, dated Oct. 1997.

Liotta, et al., "Modelling Network and System Monitoring over the Internet with Mobile Agents," IEEE, pp. 303–312, (1998).

Hariri, et al., "Design and Analysis of a Proactive Application Management System (PAMS)," Proactive Application Management System, IEEE, pp. 89–102, (2000).

International Search Report for PCT/US01/28129 (3 pages).

Wired News article titled "Getting Some Alien Experience," by Jennifer Sullivan, dated Aug. 3, 1998, 3 pages.

"SETI and Distributed Computing," by Garrett Moritz, dated 1998, printed from http://www.gtexts.com/college/papers/s7.html on Nov. 17, 2003, 5 pages.

GIMPS find a Multi–million digit prime!) by Chris Caldwell, printed from http://www.utm.edu/research/primes/notes/6972593 on Nov. 17, 2003, 3 pages, undated.

* cited by examiner

SYSTEM AND METHOD FOR MONITORING PERFORMANCE OF A SERVER SYSTEM USING OTHERWISE UNUSED PROCESSING CAPACITY OF USER COMPUTING DEVICES

RELATED APPLICATIONS

This application relates generally to the subject matter described in the following U.S. patent applications, the disclosures of which are hereby incorporated herein by reference: application Ser. No. 09/484,686, titled POST DEPLOYMENT MONITORING OF SERVER PERFORMANCE, filed Jan. 17, 2000 now U.S. Pat. No. 6,449,501; application Ser. No. 09/484,684, titled SERVICE FOR LOAD TESTING A TRANSACTIONAL SERVER OVER THE INTERNET, filed on Jan. 17, 2000 now U.S. Pat. No. 6,477,483; and application Ser. No. 09/531,821, filed Mar. 21, 2000, titled SERVER MONITORING USING VIRTUAL POINTS OF PRESENCE.

FIELD OF THE INVENTION

The present invention relates to methods for monitoring and testing the performance of a web site or other server system as experienced from multiple user locations on a computer network.

BACKGROUND OF THE INVENTION

The performance of a web site or other Internet server system, as experienced by end users of the system, can vary significantly depending on the geographic locations of the users. For example, users in London may experience much greater response times than users in San Francisco. Such variations in end user experience may occur, for example, as the result of Internet traffic conditions, malfunctioning Internet routers, or malfunctioning DNS (Domain Name Service) servers.

The ability to detect such location-dependent problems can be valuable to web site operators. For example, if users in a particular geographic region are known to frequently experience long response times, the web site operator can set up a mirror site within that region to service such users. The web site operator can also benefit from knowing whether a given problem is limited to specific geographic regions. For example, if it is known that a particular problem is seen by users in many different geographic locations, the web site operator can more easily identify the source of the problem as being local to the web site.

Some companies have addressed such needs of web site operators by setting up automated services for monitoring web sites from multiple geographic locations. These services are implemented using automated agents that run on computers at selected Internet connection points, or "points of presence." The points of presence are typically selected to correspond to major population centers, such as major cities throughout the world. The agents operate by periodically accessing the target web site from their respective locations as simulated users, and by monitoring response times and other performance parameters during such accesses. The agents report the resulting performance data over the Internet to a centralized location, where the data is typically aggregated within a database of the monitoring service provider and made available to the web site operator for viewing. The collected data may also be used to automatically alert the web site operator when significant performance problems occur.

A significant problem with the above approach is that the cost of setting up and maintaining agent computers in many different geographic regions is very high. For example, the monitoring service provider typically must pay for regional personnel who have been trained to set up and service the agent software and computers. Another problem is that users of the service can only monitor performance as seen for the fixed agent locations selected by the service provider.

SUMMARY OF THE INVENTION

The present invention provides a monitoring system and service in which community members monitor their respective Web sites, or other server systems, as seen from the computing devices of other community members. In a preferred embodiment, the system includes an agent component that runs on the computing devices of community members to provide functionality for accessing an monitoring end-user performance of a server system. By running the agent component on a computing device, a user effectively makes that computing device available to other community members for use as a remote monitoring agent. The agents are remotely programmable over a network, and may be programmable, for example, to execute a particular Web transaction while monitoring specified performance parameters (server response times, network hop delays, etc). In one embodiment, the agent component monitors performance only when the host computing device is in an otherwise idle or a low CPU-utilization state, and thus does not interfere with the ordinary operation of the host device.

The system also includes a controller that communicates with the agent computing devices over the Internet or other network. The controller keeps track of the agent devices that are currently in an active state (e.g., connected to the Internet with the agent component running) by monitoring messages transmitted by the agent devices. The system also includes a user interface (preferably part of the controller) that provides functionality for users to set up sessions to monitor their servers from the active agents (typically geographically distributed). The interface may allow the user to select the agent devices from a real time directory of active agents, and/or may allow the user to specify criteria for the automated selection of the agents.

Once a monitoring session has been set up, work requests are dispatched (preferably by the controller, or alternatively by an originating agent) to the selected agent devices. These work requests preferably specify the server system, transactions, and performance parameters to be monitored by the agents. Performance data collected by the agents during the course of the monitoring session is collected in a database and is made available for online viewing. The performance data collected by the agents may be used both to generate server-specific reports and general Internet "weather maps."

An important benefit of using shared community resources to host the agent software is that it reduces or eliminates the need for the service provider to set up and administer agent computers at various points of presence. Another benefit is that users are not limited to the fixed agent locations selected by the service provider, but rather can monitor their systems from the user locations of any other community members.

In accordance with one aspect of the invention, the controller preferably monitors the extent to which each user contributes processing resources to the community, and compensates each user accordingly. Preferably, the compensation is in the form of credit toward future use of the service. For example, once Company A has allowed other community members to execute one hundred Web transactions from Company A's computers, Company A may be permitted to execute one hundred transactions from the computing devices of other members. The use of such a reciprocal usage policy desirably encourages users to make their computing devices available to other community members when the devices are not in use.

In accordance with another aspect of the invention, the agents may implement an algorithm for measuring hop delay along the route between the agent device and a monitored server. When one agent detects a slow hop, the controller (or the agent) may automatically invoke other agents (preferably agents that frequently use the subject hop) to further test the hop. In this manner, the hop may be tested concurrently from multiple agent devices and locations to more accurately determine whether a router problem exists.

DETAILED DESCRIPTION OF THE PREFERRED EMBODIMENTS

The following description is intended to illustrate certain embodiments of the invention, and should not be read in a limiting sense. The scope of the invention is defined by the appended claims.

I. Terminology

Throughout the description, the following terms will generally have the following meanings:

The term "service provider" refers to the provider of the community-based monitoring service described herein.

The term "monitoring" refers generally to both long-term or recurring performance monitoring and to short-term performance testing (e.g., server load testing).

The term "end user performance" refers generally to the performance seen by end users of a system, and components of such performance. For example, the end user performance of a server system may include both actual server performance, and the performance of routers and other intermediate components that connect a user to the server system.

II. Overview

Figure 1:
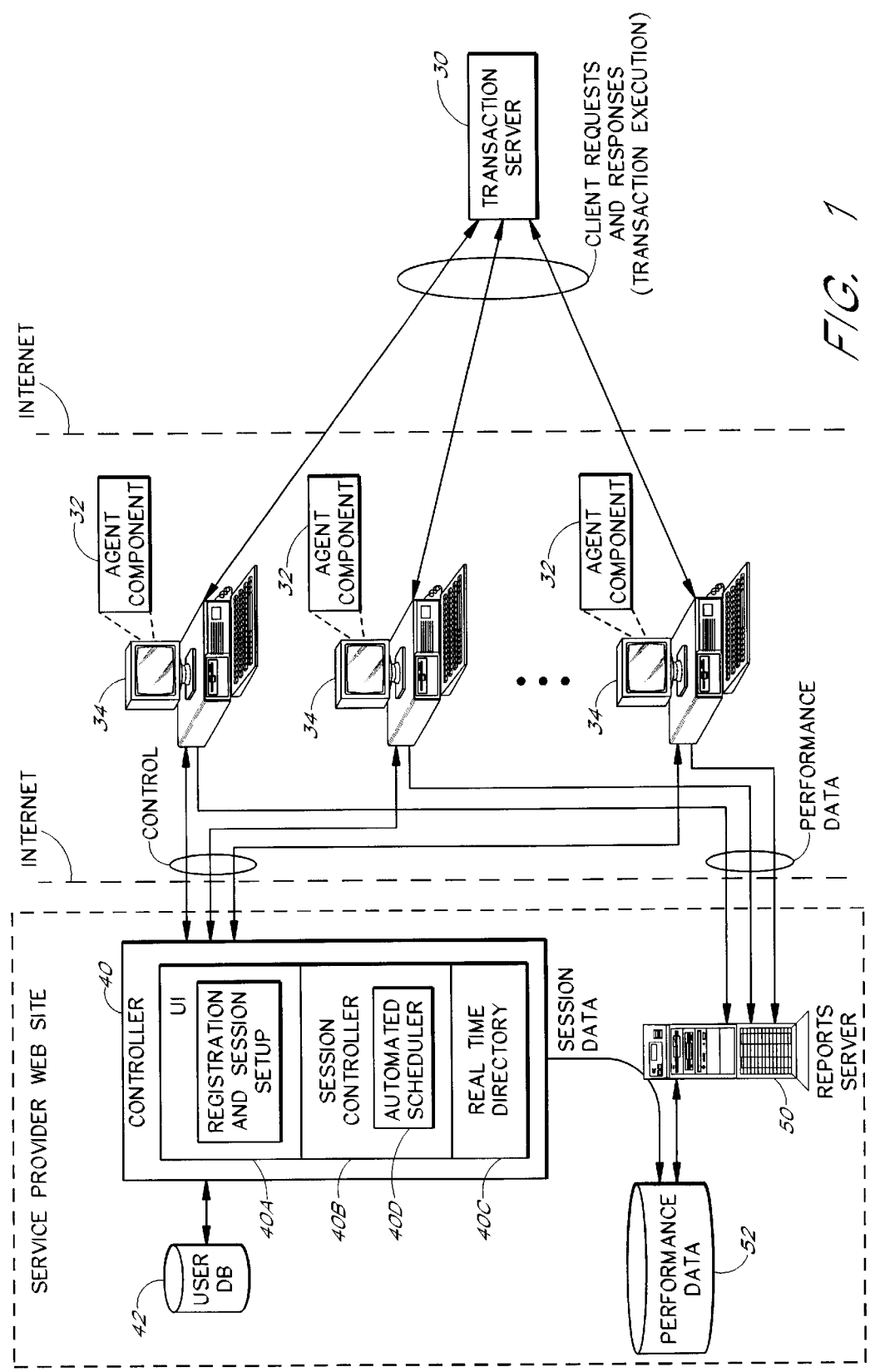
FIG. 1 illustrates the general architecture and data flow of a system according to the present invention.

FIG. 1 illustrates the architecture of a community-based performance monitoring system according to one embodiment of the invention. The system provides a service for monitoring the end user performance of transactional servers 30 (one shown in FIG. 1) as seen from multiple user locations on the Internet. The transactional server 30 is typically a Web site on the Internet, but may generally be any type of multi-user server system and may include any number of physical servers. A typical user of the service is a business that owns or operates a Web site, and wishes to monitor the Web site as seen by users in various geographical locations.

As illustrated in FIG. 1, the system includes a software agent component 32 that is adapted to be installed by users on computing devices 34 (three shown in FIG. 1). The agent component 32 may, for example, be made available by the service provider as a free download. The computing devices 34 may, for example, include end-user PCs and wireless devices having intermittent Internet access, and network servers and gateways having continuous or near-continuous Internet access. A host computing device 34 having the agent component 32 installed or running thereon is referred to herein as an "agent."

As with agents used within conventional monitoring systems, the agents 34 operate generally by accessing the transactional server 30 as simulated users while monitoring one or more performance parameters (such as total response times, hop delays, availability, etc.). A user may install and run the agent component 32 on any number of computing devices 34, and by doing so, makes each such computing device available to the community of registered service users for purposes of performance monitoring.

The agent component 32 may also include functionality for recording transactions to be emulated or "executed" by the agents. A separate recorder may alternatively be used for this purpose. Examples of typical transactions include logging in, performing a search, making a reservation, or checking a price of an item. As is conventional, the recorded transactions are typically in the form of transaction files (e.g., script files) specifying the messages generated by a client application during the user's interaction with the server system. The transaction files may also specify the content of expected server responses.

The agent component 32 is preferably designed, or is user-configurable, to monitor the transactional server only when the host computing device 34 is in an idle or lightly-loaded state, disregarding the load produced by the agent component itself. The agent component thus does not affect the performance of the computing device as seen by the user or owner of the device. The agent component may run primarily as a background task.

As depicted in FIG. 1, the system also includes a central controller 40 that communicates with the agents 34 over the Internet. As described below, one of the tasks performed by the controller is to remotely "program" the agents by dispatching work requests (e.g., transaction files and associated execution parameters) to them. The controller 40 is implemented on one or more Internet-connected servers which may, but need not, reside in the same physical location. As illustrated, the controller 40 includes a user interface (UI) 40A—preferably a collection of Web pages—for allowing users to register with the service and to thereafter set up monitoring sessions. Information provided by users during registration and session setup is stored in a user database 42.

As further depicted in FIG. 1, the controller 40 also includes a session controller 40B that keeps track of and controls service usage on a per-user-account basis. The session controller 40B preferably implements a "reciprocity" usage policy in which the extent to which a given user may use the service to monitor a transactional server is dependent upon the extent to which that user has contributed agent resources to the community. For example, once User_A's agents have been used by other community members to execute one hundred transactions, User_A may be awarded the right to execute (or to purchase at a discount) one hundred transactions using community resources. The use of a reciprocity policy desirably encourages users to make their computing devices available to the community. The reciprocity policy may be implemented by the session controller 40B by issuing tokens to users, where each token represents the right to execute (or to purchase at a discount) some number of transactions. The token counts may be maintained within the user database 42, and may be used as a form of currency for setting up or executing monitoring sessions. The service provider may also sell or award tokens to users without requiring any contribution of processing resources. The reciprocity policy may alternatively be based on duration-of-use, number of page requests generated, number of bytes transferred between agent and server, or some other metric.

Rather than using a reciprocity policy, the service provider could provide monetary compensation, free or discounted Internet access, or another form of compensation to users for their respective contributions of processing resources. With this scheme, a user may benefit from making his computer available even if he has no interest in using the monitoring service. The quantity of tokens or other compensation awarded may depend on whether the agent resources are contributed during peak versus off-peak hours. Compensation may also be given to users by the operators of the transactional servers 30 monitored by the service.

As illustrated in FIG. 1, the controller 40 maintains a real-time agent directory 40B of the agents that are currently "active" (e.g., connected to the Internet with the agent component running and available). Ideally, many hundreds or thousands of agent computers in a variety of geographic locations will be active at any given time, so that the service can monitor each transactional server 30 from many different locations concurrently. A large number of active agents also facilitates the generation of loads sufficient for server load testing. Although a centralized directory is preferred, non-centralized protocols for keeping track of active computers can be used, such as the protocol implemented within the Gnutella service for sharing music files.

The directory 40B may be used by an automated scheduler 40D that dynamically selects the agents 34 to include in monitoring sessions. The scheduler may select the agents based on resource availability (e.g., the current processing loads and availability states of the agent computers 34), and/or based criteria specified by users during session setup. In one embodiment, the scheduler implements a load-balancing algorithm to balance the load associated with concurrent sessions across the available agents 34. The automated scheduler may further distribute the load by scheduling the sessions themselves. For example, the scheduler may postpone a load test until the available agent resources are sufficient to produce the desired load. As discussed below, the directory 40B may additionally or alternatively be made available to users such that a user can manually select the agents to include in a monitoring session.

As further shown in FIG. 1, the agents 34 report the performance data they measure to a reports server 50—either directly as shown or via the controller 40. The agents preferably transmit the performance data to the reports server in real time on a transaction-by-transaction basis, together with corresponding session identifiers. The reports server stores the performance data in a database 52 in association with the user account and session to which the data corresponds. As depicted in dashed lines in FIG. 1, the controller 40 and the reports server 50 may be accessible to users via a common Internet Web site or portal.

Through a series of private, customizable online reports provided by the reports server 50, users can view graphs and charts of the various performance parameters measured by the agents 34. Depending upon the type of agent and transactional server used, these parameters may include, for example, average and maximum transaction response times, "breakdowns" of transaction response times (e.g., time spent on the client, server, and network), hop delays along the network paths between the agents and the transactional server, and transaction failure rates. The reports server 50 may also allow the user to view the performance data associated with a particular agent "attribute" such as location, ISP (Internet Service Provider), connection speed, or closest frequently-used router. For example, the user may view the average response time as seen from users (agents) in London, or as seen from agents that use a particular ISP. Examples of the types of reports that may be used are provided in above-referenced U.S. application Ser. No. 09/484,686.

In addition to providing account-specific or server-specific reports, the reports server 50 may generate and provide public access to one or more Internet "weather maps" (general reports on the current status of the Internet). These weather maps may be generated based on an analysis of the collected performance data aggregated over multiple user accounts, and may include information about router problems, congestion conditions, and other types of conditions detected by the agents. For example, the weather maps could include one or more of the following types of data: (1) general Internet line loads (carriers, tier-1,2,3); (2) behavior of routers, including errors, load, misconfiguration, and redirection data; (3) behavior of distributed load balancers, such as information about "bad" and "good" redirections, (4) Domain Name System (DNS) server response times and errors; (5) performance parameters of various types of end servers, such as World Wide Web, Mail, and FTP; and (6) caching problems.

The information contained within the Internet weather maps may be used by ISPs ASPs (Application Service Providers) and content providers (among others) to locate and correct hardware problems, reroute and more efficiently distribute Internet traffic and content, and monitor service as seen by customers. Specific examples include the following: 1. reseating configuration, such as by selecting locations of distributed server load balancers (SLBs) and mirror sites; (2) site Akamization; (3) resetting Peering Agreements; (4) monitoring compliance with Service Level Agreements (SLAs) from the end-user point of view; (5) by ISPs to provide online end-user support; and (6) by cable and DSL operators to monitor in real time the quality of the service provided to their customers.

In addition to the components shown in FIG. 1, the system may optionally include any number of dedicated agent computers provided by the service provider. The dedicated agent computers may be provided at (or remotely connected to) fixed points of presence on the Internet.

Various types of safeguards may be built into the system to protect the community members from privacy and security breaches. For example, the service may prevent users from exercising Web sites or systems other than their own. The service may also place other restrictions on the types of transactions that can be dispatched to the agents of other community members. In addition, the service may maintain the anonymity of the community members (i.e., not reveal the identity of one community member to another), and may report the session data without revealing details of the agent devices 34 used within the session.

III. Registration and Session Setup

In one embodiment, users register with the service and set up monitoring sessions using a Web site of the service provider using an ordinary Web browser. The user interface for registering and setting up sessions may alternatively be incorporated into the agent component 32. As part of the registration process, the user may be given a certain number of tokens, or may be permitted to run monitoring sessions for a limited time period using the service provider's dedicated agents. The user may also be asked to review and accept the terms of an online agreement specifying terms of use of the monitoring service.

During registration, the user enters various account information, including the URL (Uniform Resource Locator) of the transaction server to be monitored. The user may also be asked to specify the attributes (e.g., locations, ISPs, connection speeds, IP addresses, etc.) of the computer or computers 34 to be used as agents. In addition, the user may be permitted to specify the times of day during which his agent computers may be used by the community. Once the registration process is complete, the user can record transactions using conventional recording methods (e.g., using a built-in recorder of the agent component 32), and can upload the recorded transaction files to the user database 42.

Figure 2:
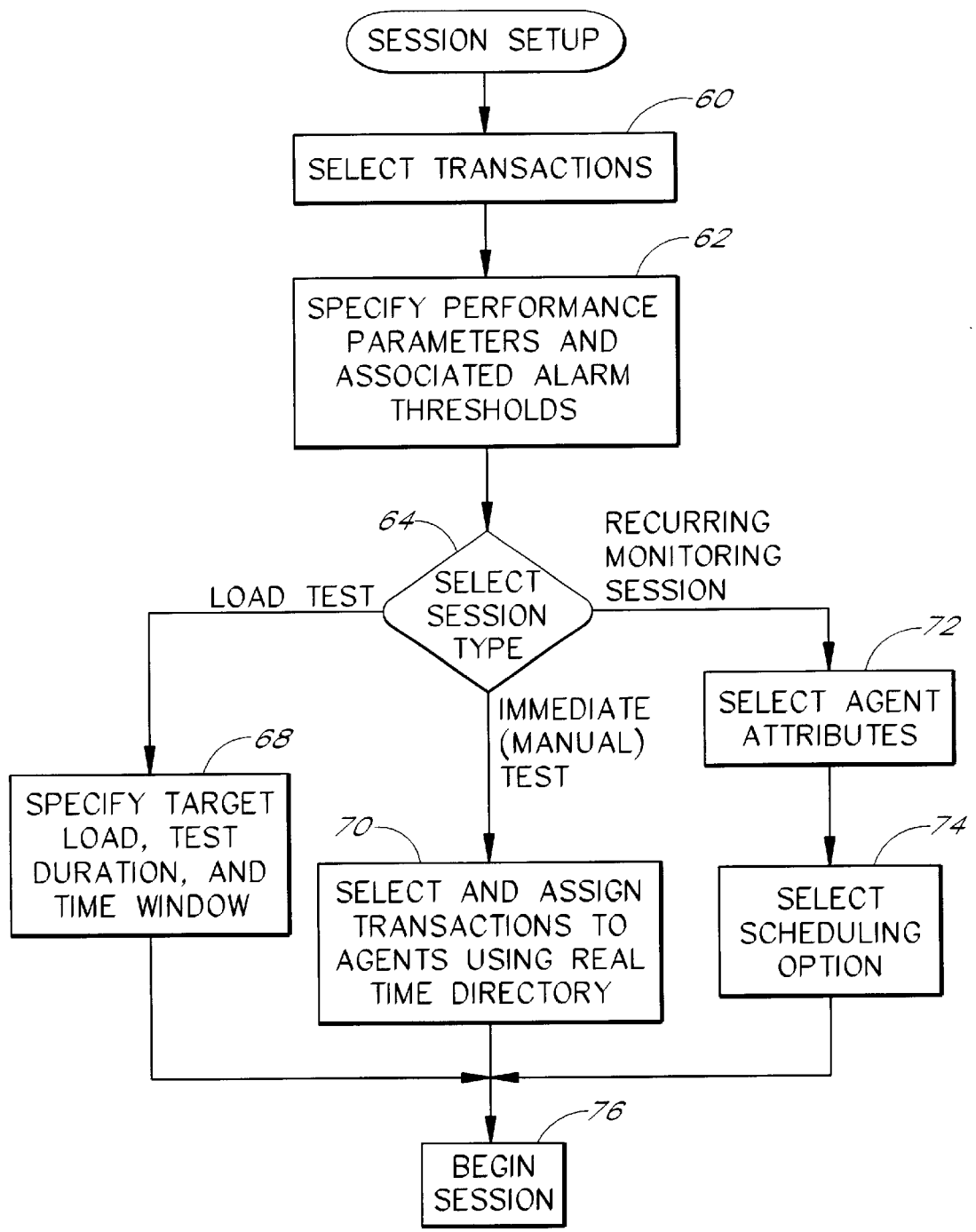
FIG. 2 illustrates an example process for setting up a monitoring session.

FIG. 2 illustrates one example of a process that may be used to set up monitoring sessions through the controller's user interface 40A. The reference numbers included in FIG. 2 are included in parentheses in the following description. Initially, the user selects the prerecorded transaction or transactions to use (60) and specifies the performance parameters to be monitored (62). Although the use of prerecorded transactions is preferred, the agents could monitor end user performance without using transactions. For example, the agents 34 could merely ping the transactional server to test for immediate availability, and/or test network latency as described below.

To protect against denial-of-service attacks and other types of misuses of the monitoring service, the controller 40 may automatically check the selected transactions to ensure that they are directed exclusively to transactional servers operated by the user setting up the session. The user may also specify parameter or service level thresholds for generating alarm conditions. As illustrated, the user is then prompted to select between the following three session options: load test, immediate (manual) test, and recurring monitoring session (64).

If the "load test" option is selected, the user is prompted to specify the target load, such as in hits or transactions per minute (68). As illustrated, the user may also be prompted to specify a duration and time window for performing the test. The automated scheduler 40D uses these parameters both to schedule the load test and to select the agent computers 34 to use. In token-based implementations, if the user's token count is insufficient to perform the load test, the user may be given the option to purchase additional tokens (not shown). During execution of the load test, the controller 40 may monitor the actual load applied to the transactional server 30 (by monitoring the performance data streams from the relevant agents 34), and may increase or decrease the number of agents, and/or the number of virtual users emulated by the agents, as needed to generate the target load.

If the "immediate (manual) test" option is selected, the user is prompted to select the agents 34 from the real time directory 40C and to assign transactions to these agents (70). To facilitate the selection of agents, the user interface may provide a filter or search engine for allowing the user to quickly locate available agents having desired attributes. For example, the user may be able to run a search for the agents that are connected directly to, or which frequently use, a particular router, or to run a search for the agents that frequently use a particular service provider or carrier. The user may also specify various other parameters (not shown), such as the total number of transaction execution events, and may be given the option to purchase tokens. Once the parameters have been entered, the test is initiated and is executed to completion.

If the "recurring monitoring session" option is selected, the user is prompted to specify agent attributes to be used by the automatic scheduler 40D to dynamically select the agents (72). These attributes may include, for example, geographic regions (e.g. cities), ISPs, nearest routers, or agent device types. The user may also be given the option to manually select one or more fixed (dedicated) agents. The user is also prompted to select a scheduling option for executing the recurring session (74). The scheduling options may include, for example, "run whenever token count reaches X tokens," "run once per hour," "run whenever host is idle," "use tokens as they are awarded," or "purchase tokens as needed to maintain target transaction rate." The user may also be given the option to specify other types of session parameters (not shown), such as maximum load. Once the recurring session is initiated, the session continues until terminated by the user.

IV. Agent-Controller Communications Protocol

Figure 3:
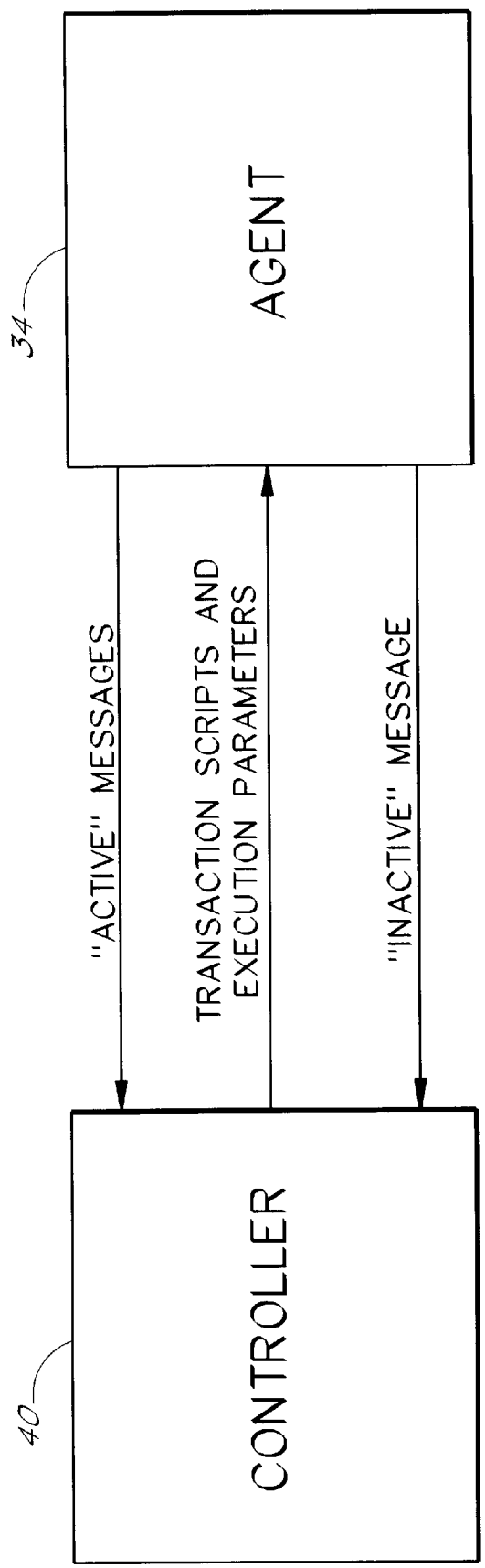
FIG. 3 illustrates the flow of information between an agent and the controller in FIG. 1.

FIG. 3 illustrates the communications that occur between each agent 34 and the controller 40 in one embodiment. When the agent 34 is in an active state, the agent sends "active" messages to the controller 40—either periodically or in response to polling messages from the controller. The agent 34 may be configurable by the user to enter the active state only during certain times of day, or only when the processing load (e.g., CPU utilization) of the agent device 34 is below a specified threshold. The "active" messages may include unique agent identifiers to allow the controller to look up the agents and associated attributes in the database 42. The messages may also include information about the current processing load of the agent device 34. The controller 40 uses the "active" messages received from the agents to maintain the real time directory 40C, and to select agents for use.

When the controller 40 assigns an agent to a particular session, the controller sends a "work request" to the agent to effectively program the agent. As depicted in FIG. 3, the work request includes one or more transaction files (e.g., scripts) that define the transaction(s) to be executed by the agent. If the transaction server 30 is a Web site, these files specify the HTTP messages (URL requests, etc.) to be generated by the agent, and any expected responses from the server. The controller 40 also sends associated execution parameters to the agents, such as the number of transaction iterations, the number of concurrent virtual users, the types of parameters to monitor, and a session identifier.

One possible variation of this agent programming method is to use agents that are configured to send work requests to other agents directly by peer-to-peer communications. With this method, the agent that sets up a monitoring session could initially access the controller 40 to identify the other agents to use, and could then dispatch transaction files and associated execution parameters directly to such agents. The agents could also be configured to report the performance data directly to the originating agent.

As further illustrated in FIG. 3, the agent 34 may be configured to send an "inactive" message to the controller 40 to indicate a transition to an inactive state. The agents may be configured to send "inactive" messages when, for example, the agent device's CPU utilization remains above a threshold level for a particular period of time, or when the agent component 32 is properly closed by a user. Upon receiving an "inactive" message or otherwise detecting a transition to an inactive state, the controller may automatically transfer the inactive agent's sessions to a suitable replacement agent.

V. Measurement of Hop Delays

One application for the invention involves the use of the agents 34 to monitor segment or "hop" delays on the Internet. By way of background, a software utility known as traceroute (included in Microsoft Windows 95/98/NT and other operating systems) exists for determining the hop delays along each segment of a route between a source and a destination computer. The traceroute utility operates generally by sending of a packet (using the Internet Control Message Protocol or ICMP) from the source computer, and including in the packet a time limit value (known as the TTL, or "time to live") that is designed to be exceeded by the first router that receives the packet. This router responds to the expiration of the TTL value by discarding the ICMP packet and returning a Time Exceeded message. This enables traceroute to determine the time required for the hop to the first router. After increasing the time limit value, traceroute resends the packet so that reaches the second router in the path to the destination, which returns another Time Exceeded message, and so on. In this manner, traceroute can measure the response time or delay of each successive hop. Traceroute determines when the packet has reached the destination by including a port number that is outside the normal range. When the packet is received by the destination computer, a Port Unreachable message is returned, enabling traceroute to measure the time length of the final hop.

In accordance with one aspect of the invention, the agent component 32 includes a traceroute-type utility for monitoring hop delays between an agent computer 34 and a Web server 30. The utility is preferably the WebTrace™ utility available from Mercury Interactive Corporation. The WebTrace utility uses the same general hop delay measurement algorithm as conventional traceroute utilities, but sends HTTP (Hypertext Transfer Protocol) packets (and specifically, TCP "SYN" frames) rather than ICMP packets. The destination server responds to the SYN frame by returning a SYN/ACK message. An important benefit to using HTTP packets is that the packets are less likely to be blocked by Internet firewalls. Another benefit is that the HTTP packets are more likely to follow the route used for ordinary Web traffic.

Figure 4:
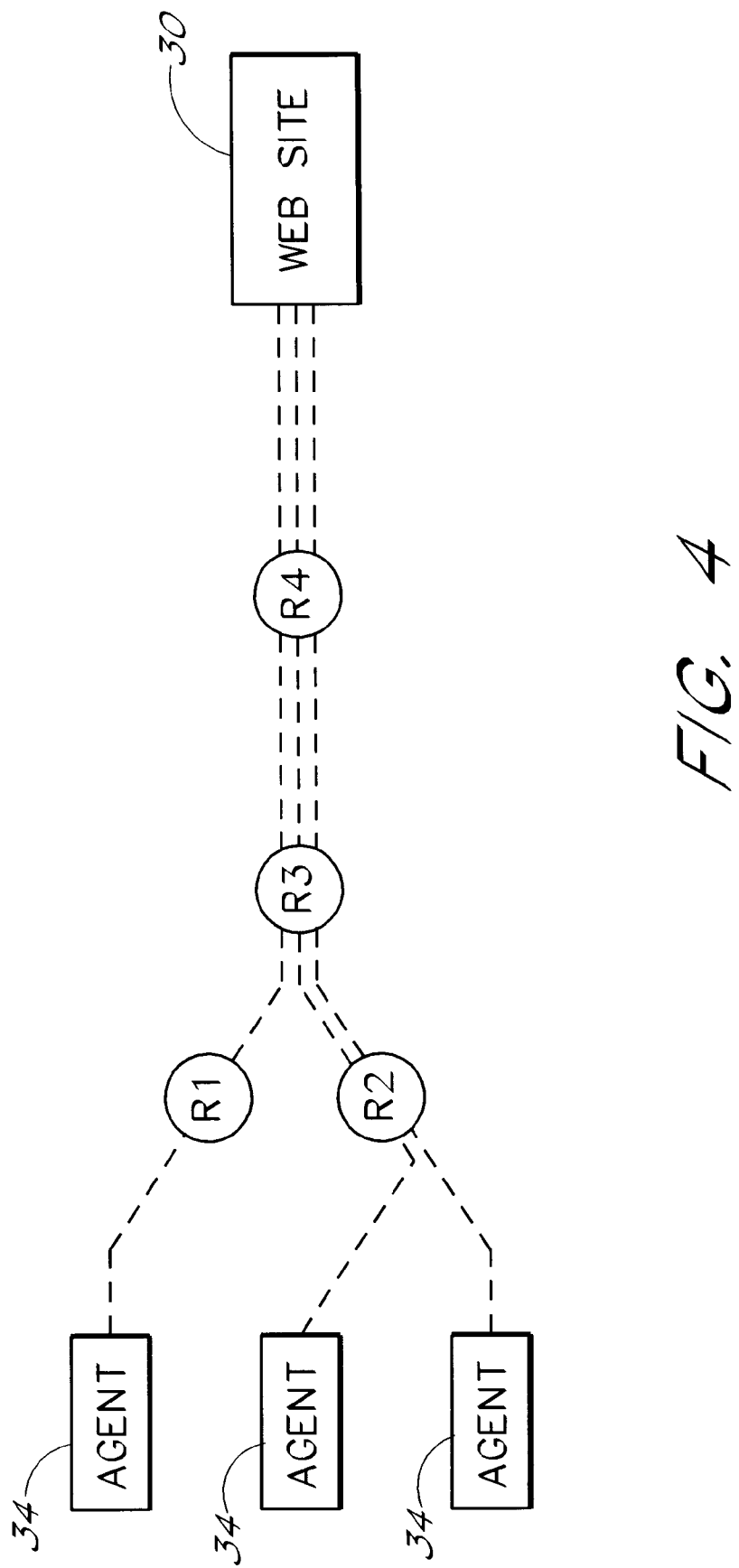
FIG. 4 illustrates the use of multiple agents to measure delay along a network segment.

The hop delays measured by the agents 34 may be used, for example, to pinpoint and correct router problems that are the source of poor end-user performance. To measure hop delay and pinpoint router problems with a high degree of reliability, it is desirable to monitor the hop delays using multiple, independent agents in different locations. This is illustrated in FIG. 4, in which three different agents 34 use the hop between routers R3 and R4 to communicate with a monitored Web site 34. The likelihood of multiple agents using the same network segment can be statistically increased by including a large number of agents within a monitoring session.

Figure 5:
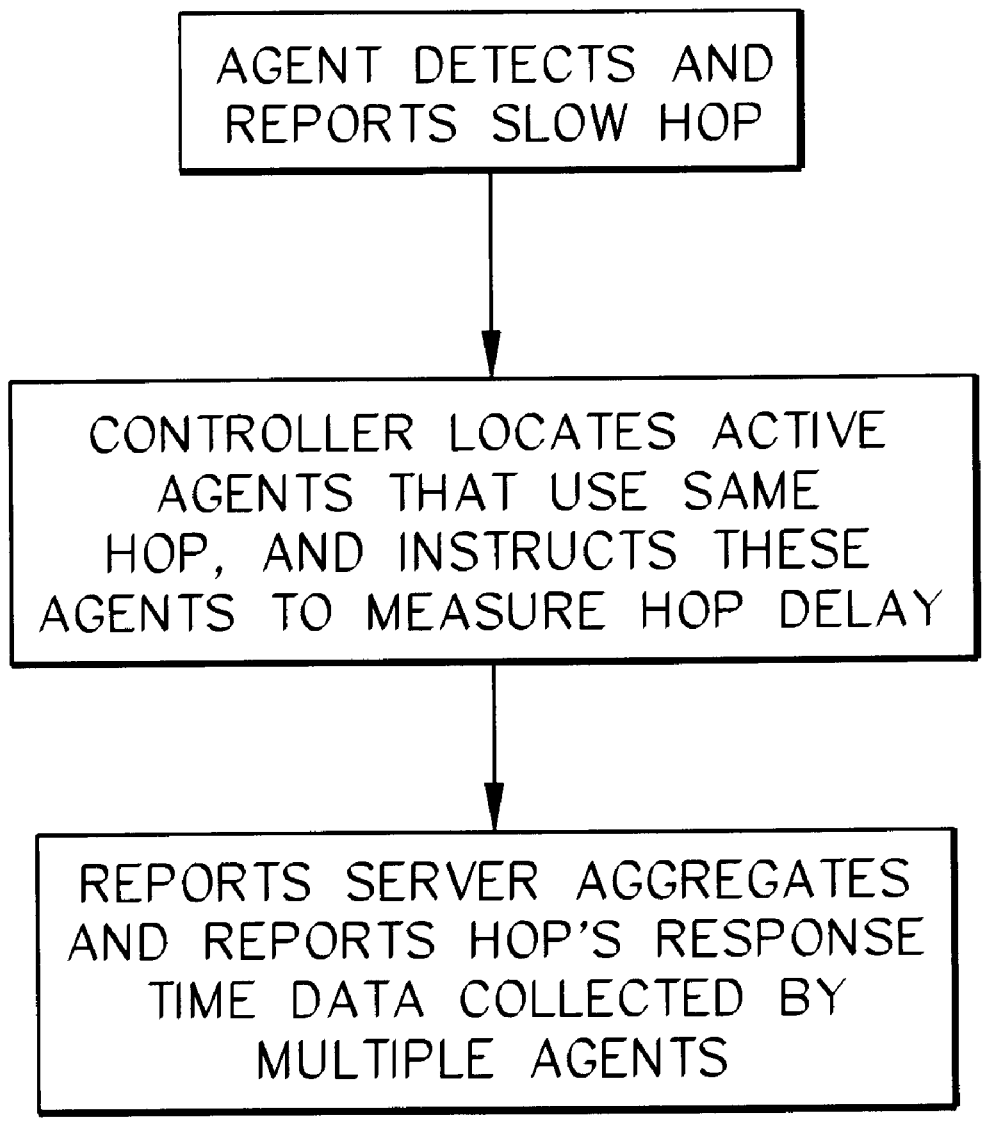
FIG. 5 illustrates a method for using multiple agents for more accurately testing hop delay on a network.

To further increase the likelihood of multiple agents using a particular hop, the controller 40 (and/or the agent component 32) may include functionality for locating active agents that are directly connected to, or which commonly use (based on past history), a particular router or hop. For example, once a slow hop has been identified by an agent 34, the controller 40 (or that agent) may automatically search for other active agents that use, or are likely to use, the same hop. As depicted in FIG. 5, the controller may automatically incorporate these agents into the session, and instruct them to invoke the WebTrace utility to monitor hop delay. These agents may alternatively be suggested to the user, or may be located "manually" using a search utility of the controller's user interface. The aggregated hop delay data generated by the agents for the slow hop provides a more accurate indication of whether a router problem exists.

As will be recognized by the foregoing, special Web sites 30 can be set up on the Internet for purposes testing hop delays and other components of network latency. These Web sites, which can be set up at obscure URLs, could serve the sole purpose of responding to requests from agents 34, without actually providing any service to users. This would allow the agents to monitor network latency without placing a load on a Web site used by actual customers.

As mentioned above, the router and hop delay data captured the agents 34 may also be aggregated and incorporated into an Internet weather map.

VI. Example Applications

The system and methods described above may be used to monitor end user performance of Web sites and various other types of multi-user systems. One particular application for the invention is to monitor performance as seen by users of WAP (Wireless Application Protocol) wireless devices. For example, the agent components 32 may be adapted to run on WAP phones, and to monitor a WAP application server when the phones are not otherwise being used. The performance data collected by these agent phones 34 may be used to monitor the WAP application server and/or the status of the associated wireless links. A WAP service provider may provide free or discounted service to users who permit their phones to be used as monitoring agents.

Another specific application involves running the agent component 32 on residential gateways 34 used to interconnect home networks to outside networks. This approach allows the unused processing power of a residential gateway to be used to monitor Web sites and other types of systems. Users who make their residential gateways available for this purpose may receive free or discounted Internet access, free or discounted access to the content of a monitored Web site, or other forms of compensation.

Other applications for the invention will be apparent to those skilled in the art.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow.

What is claimed is:

1. A method of monitoring performance of a server system, the method comprising:
   monitoring CPU utilization of each of a plurality of user computers that are distributed geographically on a computer network to identify a group of said user computers that are in a substantially idle state, said group comprising multiple user computers;
   causing the substantially idle user computers in the group to access a target server system over the computer network as simulated users thereof while monitoring performance of the target server system, such that each of the user computers in the group generates performance data reflective of the performance of the target server system as seen from the respective locations of such user computers; and collecting the performance data from each of the user computers in the group;

whereby otherwise unused processing capacity of the user computers is used to monitor the target server system.

2. The method of claim 1, wherein the group of user computers comprises computers in multiple different geographic locations, and the user computers monitor end user performance of the target server system as seen from each of the multiple geographic locations.

3. The method of claim 1, wherein causing the substantially idle user computers in the group to access the target server system comprises sending work requests over the computer network to the user computers in the group in response to detecting that each such user computer is in a substantially idle state.

4. The method of claim 1, wherein causing the substantially idle user computers in the group to access the target server system comprises executing, on each user computer, an agent component that initiates an access to the target server system when its respective user computer is substantially idle.

5. The method of claim 1, wherein the CPU utilization of each of the plurality of user computers is monitored using an agent component installed on each of the plurality of user computers, said agent component including functionality for communicating with target server systems as a simulated user.

6. The method of claim 5, wherein the agent component runs as a background task on each of the plurality of user computers.

7. The method of claim 1, wherein the method comprises controlling the user computers in the group so as to apply a controlled load to the target server system, to thereby load test the target server system.

8. The method of claim 1, further comprising determining whether a quantity of processing resources provided by the group of user computers is sufficient to apply a specified load to the target server system.

9. The method of claim 1, wherein the performance data collected from the user computers in the group includes hop delay data for network hops between the target server system and specific user computers.

10. The method of claim 9, further comprising aggregating the hop delay data received from multiple user computers for a common hop, and using the aggregated hop delay data to evaluate performance of a router associated with the hop.

11. The method of claim 1, further comprising maintaining, for at least one user computer in the group, a record reflective of a quantity of that user computer's resources used to monitor the target server system.

12. The method of claim 11, further comprising using the record to control an extent to which an associated user can use the plurality of user computers to monitor a second target server system.

13. A server monitoring system that operates according to the method of claim 1.

14. A server monitoring system, comprising:

an agent component that is adapted to run on user computing devices to form agents for monitoring target server systems, wherein the agent component includes functionality for monitoring processing loads of the user computing devices on which the agent component runs, and further includes functionality for monitoring server performance by at least (a) sending request messages to specific target server systems as simulated users thereof, and (b) monitoring responses to such request messages to generate performance data, wherein the agent component is configured to monitor end user performance only when a host computing device on which the agent component runs is in a substantially idle state;

a controller that sends work requests to the agents over a computer network, the work requests specifying request messages to be sent by the agents to specific target server systems; and a reports server that generates performance reports based on the performance data generated by the agents;

wherein the agent component takes processing loads of the user computing devices into consideration in determining when to send the requests messages to the target server system such that the target server system is monitored primarily using otherwise-unused processing resources of the user computing devices.

15. The server monitoring system of claim 14, wherein the agent component runs as a background task on the user computing devices.

16. The server monitoring system of claim 14, wherein the agent component monitors performance of a target server system from a host computing device only when a processing load of the host computing device falls below a specified threshold, so that the agent component does not substantially interfere with ordinary operation of the host computing device.

17. The server monitoring system of claim 14, wherein the controller controls the agents so as to apply a controlled load to a target server system, to thereby load-test the target server system.

18. The system as in claim 14, wherein the agents measure and report network hop delays, and the reports server aggregates hop delay data collected by the agents over multiple monitoring sessions to generate a general network status report.

19. The server monitoring system of claim 14, wherein the controller takes into consideration the geographic locations of the agents in selecting a set of agents to use to monitor a target server system.

20. The server monitoring system of claim 14, wherein the controller takes into consideration the current processing loads of the agents in selecting a set of agents to use to monitor a target server system.

21. The server monitoring system of claim 14, wherein the controller supports an ability to set up a monitoring session in which a plurality of geographically distributed agents are used to access and monitor a target server system, such that end user performance of the target server system may be monitored as seen from multiple geographic locations.

22. The system as in claim 14, wherein the controller implements a reciprocity policy in which a user of the system is given credit toward use of the system when a computing device of that user is used as an agent within a monitoring session of another user.

23. The system as in claim 14, further comprising a user interface that displays a directory of agents that are available for use, and provides user functionality for manually selecting agents to include in a monitoring session.

* * * * *